US012780623B2

(12) United States Patent
Lotfi et al.

(10) Patent No.: US 12,780,623 B2
(45) Date of Patent: Nov. 3, 2026

(54) ELEVATOR BRAKE ASSEMBLY HAVING ASYMMETRICAL BRAKE

(71) Applicant: Otis Elevator Company, Farmington, CT (US)

(72) Inventors: Amir Lotfi, South Windsor, CT (US); Michael C. Lang, Southbury, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 1520 days.

(21) Appl. No.: 17/368,141

(22) Filed: Jul. 6, 2021

(65) Prior Publication Data

US 2021/0331902 A1 Oct. 28, 2021

Related U.S. Application Data

(62) Division of application No. 15/261,722, filed on Sep. 9, 2016, now abandoned.

(Continued)

(51) Int. Cl.

*B66D 5/30* (2006.01)
*B66B 1/32* (2006.01)

(Continued)

(52) U.S. Cl.

CPC .................. *B66D 5/30* (2013.01); *B66B 1/32* (2013.01); *B66D 5/08* (2013.01); *B66D 5/14* (2013.01); *B66B 5/0031* (2013.01)

(58) Field of Classification Search

CPC ....... B66B 1/24; B66B 1/26–302; B66B 1/32; B66B 5/00; B66B 5/0006; B66B 5/0018; B66B 5/0031; B66B 5/0037; B66D 5/00; B66D 5/02; B66D 5/06–14; B66D 5/18–24; B66D 5/30

See application file for complete search history.

(56) References Cited

U.S. PATENT DOCUMENTS 5,244,060 A * 9/1993 Tanaka .................... F16D 49/16 187/261
6,202,804 B1 3/2001 Dropmann et al.

(Continued)

FOREIGN PATENT DOCUMENTS

CN 101044081 A 9/2007
DE 3424595 A1 6/1988

(Continued)

OTHER PUBLICATIONS

European extended search report for Application No. 16188193.3; Issued Feb. 28, 2017; 7 Pages.

(Continued)

*Primary Examiner* — Christopher Uhlir

(74) *Attorney, Agent, or Firm* — CANTOR COLBURN LLP

(57) ABSTRACT

An elevator brake assembly including an asymmetrical brake comprising at least three brake segments, a brake activating device operably coupled to the asymmetrical brake, the brake activating device comprising a first activation element and a second activation element, wherein the first activation element is configured to activate one of the at least three brake segments, and the second activation element is configured to activate the remaining of the at least three brake segments.

8 Claims, 3 Drawing Sheets

Related U.S. Application Data

(60) Provisional application No. 62/216,482, filed on Sep. 10, 2015.

(51) Int. Cl.

| | |
|---|---|
| ***B66B 5/00*** | (2006.01) |
| ***B66D 5/08*** | (2006.01) |
| ***B66D 5/14*** | (2006.01) |

(56) References Cited

U.S. PATENT DOCUMENTS

| | | | | |
|---|---|---|---|---|
| 6,237,730 | B1 | 5/2001 | Dropmann et al. | |
| 6,675,939 | B2 | 1/2004 | Maurice et al. | |
| 7,958,977 | B2 | 6/2011 | Klingler et al. | |
| 8,550,219 | B2 | 10/2013 | Eberle et al. | |
| 9,587,690 | B2 * | 3/2017 | Boffelli | F16D 65/847 |
| 2006/0151254 | A1 | 7/2006 | Sevilleja-Perez et al. | |
| 2006/0260886 | A1 * | 11/2006 | Erlston | F16D 55/50<br>188/71.5 |
| 2013/0081905 | A1 | 4/2013 | Illan et al. | |
| 2017/0073184 | A1 | 3/2017 | Lotfi et al. | |

FOREIGN PATENT DOCUMENTS

| | | | |
|---|---|---|---|
| DE | 3642013 | A1 | 6/1988 |
| DE | 19737485 | C1 | 6/1999 |
| DE | 19807654 | A1 | 8/1999 |
| EP | 1254323 | B1 | 11/2002 |
| EP | 2201260 | A1 | 6/2010 |
| EP | 2331839 | A1 | 6/2011 |
| EP | 2351944 | A1 | 8/2011 |
| EP | 2474753 | A2 | 7/2012 |
| ES | 2336864 | B2 | 4/2010 |

OTHER PUBLICATIONS

European Search Report for Application No. 16188193.3; Issued Jul. 5, 2021; 6 Pages.

* cited by examiner

ELEVATOR BRAKE ASSEMBLY HAVING ASYMMETRICAL BRAKE

CROSS-REFERENCE TO RELATED APPLICATIONS

This application is a divisional of U.S. patent application Ser. No. 15/261,722, filed Sep. 9, 2016, the entire contents of which are incorporated herein by reference, which claims the benefit of U.S. Provisional Application No. 62/216,482, filed Sep. 10, 2015, the entire contents of which are incorporated herein by reference.

TECHNICAL FIELD

The presently disclosed embodiments generally relate to elevator systems and more specifically, to an elevator brake assembly.

BACKGROUND

Elevators are presently provided with a plurality of braking devices which are designed for use in normal operation of the elevator, as for example to hold the elevator car in place when it stops at a landing; and which are designed for use in emergency situations such as stopping the elevator car and/or counterweight from rapidly descending into the hoistway pit.

Electromechanical brakes are generally designed and installed in two sets controlled by a single coil. Each set of brakes has equal torque and are applied simultaneously. For multiple segment brake assemblies (i.e. more than two brake sets), multiple brake coils are required to provide flexibility in the timing of the application of the brakes. As a result, the increased number of coils increases the cost of the elevator system. There is therefore a need for a more cost effective solution for multiple segment brake assemblies.

SUMMARY

In one aspect an elevator brake assembly is provided. The elevator brake assembly includes an asymmetrical brake including at least three brake segments, and a brake activating device operably coupled to the asymmetrical brake. The brake activating device includes a first activation element and a second activation element, wherein the first activation element is configured to activate one of the at least three brake segments, and the second activation element is configured to activate the remaining of the at least three brake segments. In any embodiment, the first activation element comprises a first coil and the second activation element includes a second coil.

In one embodiment the at least three brake segments are located adjacent to one another and circumferentially disposed around a plate. In another embodiment, the at least three brake segments include a first brake segment and a second brake segment circumferentially disposed around a third brake segment. In another embodiment, the at least three brake segments include a first brake segment positioned adjacent to a second brake segment; the first activation element is positioned adjacent to the first brake segment and the second brake segment, a third brake segment positioned adjacent to the first activation element and the second activation element is positioned adjacent to the third brake segment.

In any embodiment, the at least three brake segments further include a plurality of brake applying portions, wherein a respective one of the plurality of brake applying portions is disposed on each of the at least three brake segments. In an embodiment, the plurality of brake applying portions includes a plurality of shoes.

In one aspect, an elevator system is provided. The elevator system includes a machine housing, a rotatable output shaft mounted in said machine housing, a sheave mounted on said output shaft and rotatable therewith, and a brake assembly configured for braking said output shaft. The brake assembly includes an asymmetrical brake including at least three brake segments, and a brake activating device operably coupled to the asymmetrical brake, the brake activating device comprising a first activation element and a second activation element, wherein the first activation element is configured to activate one of the at least three brake segments, and the second activation element is configured to activate the remaining of the at least three brake segments. In an embodiment, the first activation element includes a first coil and the second activation element includes a second coil.

In an embodiment, the asymmetrical brake includes at least three brake segments located adjacent to one another and circumferentially disposed around a plate. In another embodiment, the asymmetrical brake includes a first brake segment and a second brake segment circumferentially disposed around a third brake segment. In another embodiment, the asymmetrical brake includes a first brake segment positioned adjacent to a second brake segment; the first activation element is positioned adjacent to the first brake segment and the second brake segment, a third brake segment positioned adjacent to the first activation element, and the second activation element is positioned adjacent to the third brake segment.

In any embodiment of the elevator system, the asymmetrical brake further includes a plurality of brake applying portions, wherein a respective one of the plurality of brake applying portions is disposed on each of the at least three brake segments. In an embodiment, the plurality of brake applying portions includes a plurality of shoes Other embodiments are also disclosed.

DETAILED DESCRIPTION

Figure 1:
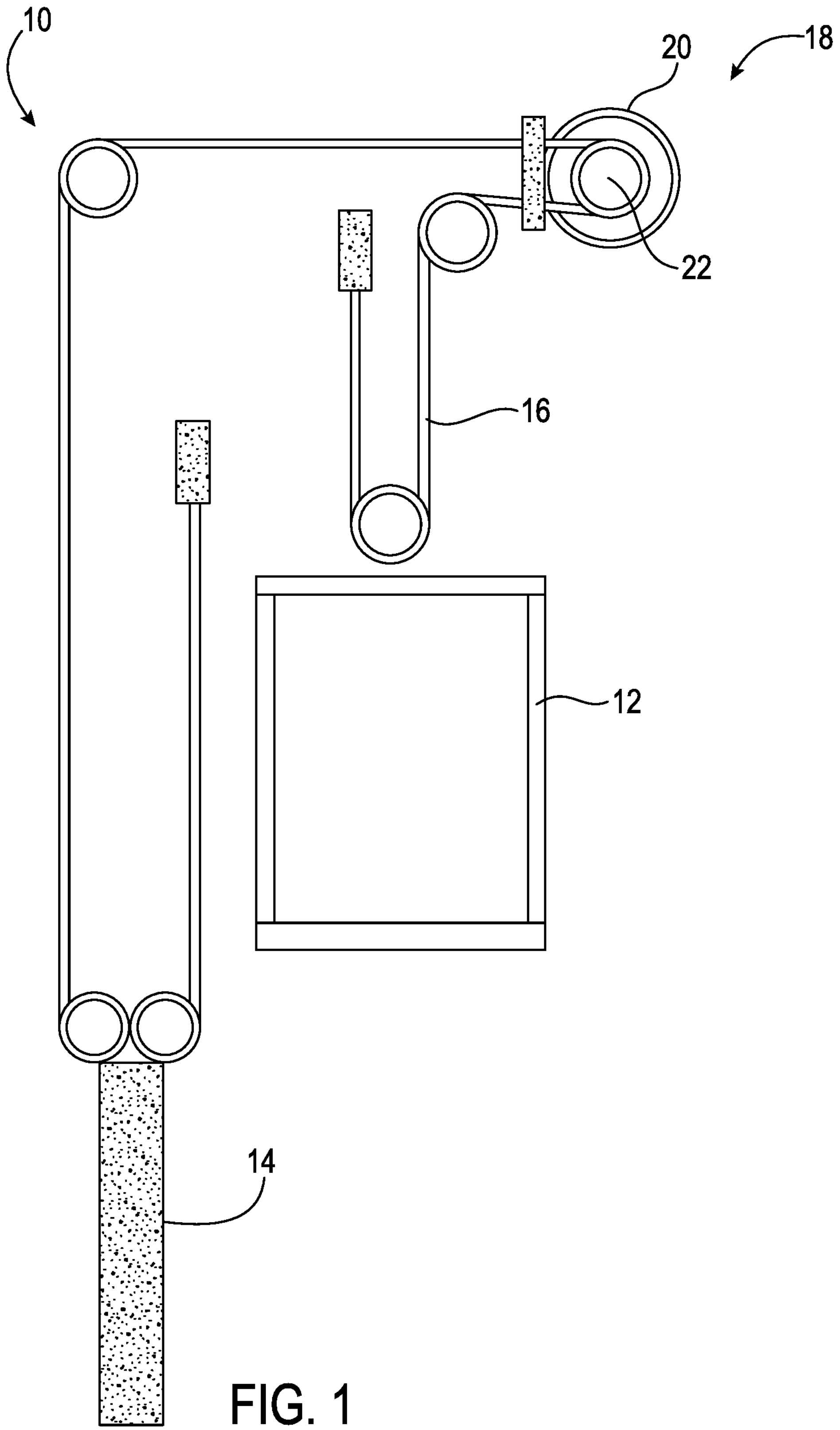
FIG. 1 illustrates a schematic drawing of an elevator system.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates an elevator system, generally indicated at 10. The elevator system 10 includes an elevator car 12 and counterweight 14. A roping arrangement 16 (e.g., round ropes or flat belts) supports the weight of the elevator car 12 and counterweight 14 in a known manner. An elevator machine 18 includes a motor 20 associated with a traction sheave 22.

Figure 2:
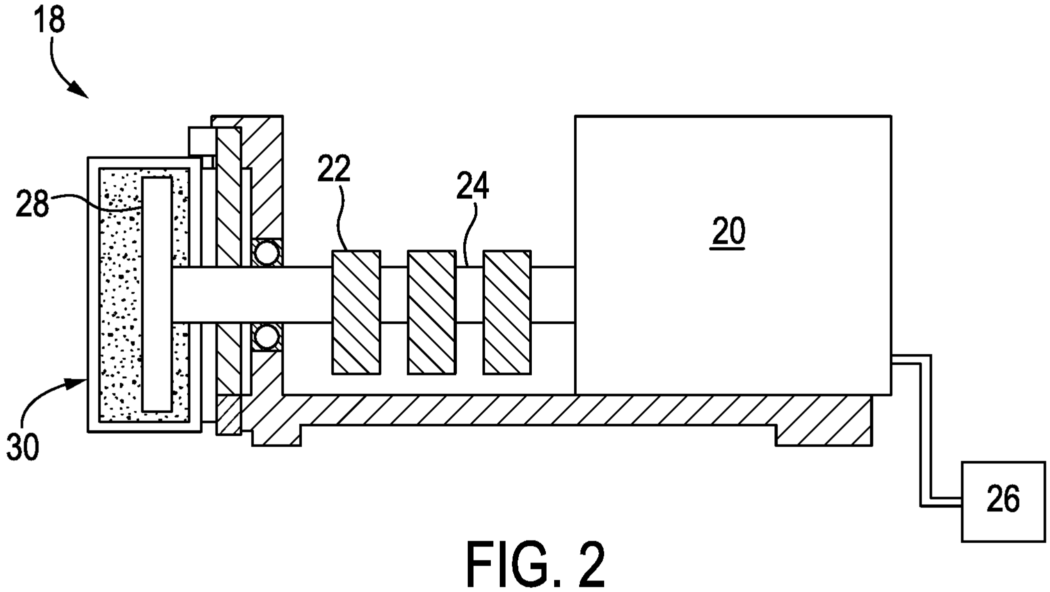
FIG. 2 illustrates a cross-sectional view of selected portions of an elevator machine.

FIG. 2 illustrates a cross-sectional view of selected portions of the example elevator machine 18. The motor 20 selectively drives a shaft 24 in response to signals from a controller 26. Rotation of the shaft 24 moves traction sheaves 22, which move ropes or belts to move the elevator car 12 and counterweight 14 in the hoistway as known. The example shaft 24 includes a disk 28 within a brake assembly 30. The brake assembly 30 selectively applies a braking force to the disk 28 to resist rotation of the shaft 24. In one example, the controller 26 commands the brake assembly 30 to apply a braking force to hold the elevator car 12 at a selected building landing (not shown) or to slow the movement of the elevator car 12.

Figure 3:
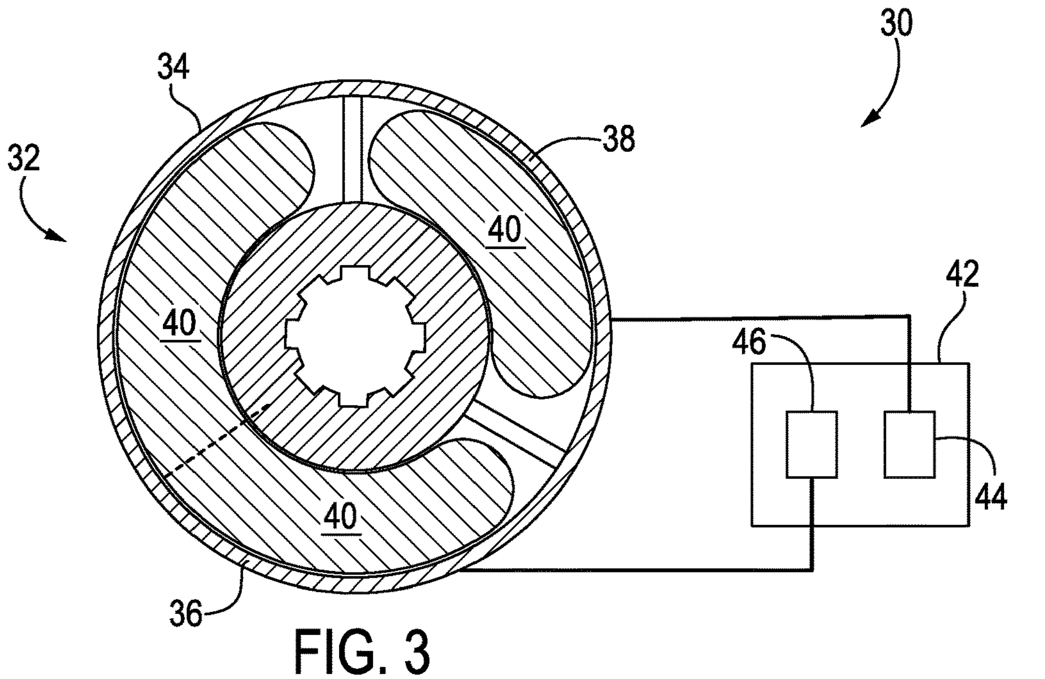
FIG. 3 illustrates a schematic drawing of a brake assembly according to one embodiment of the present disclosure.
Figure 4:
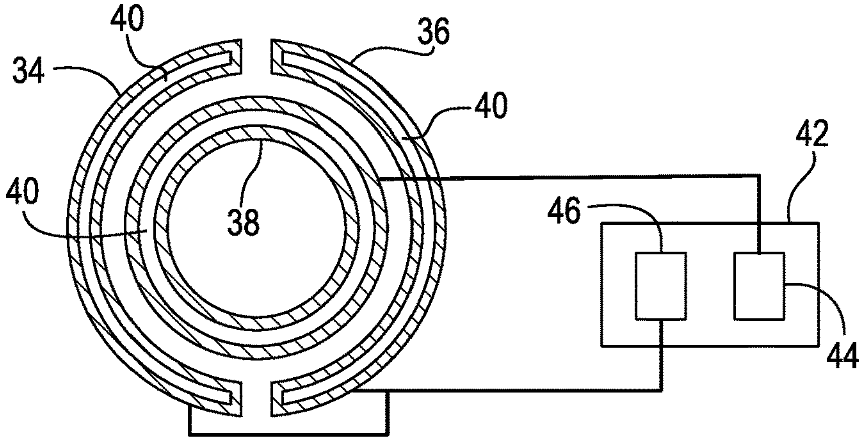
FIG. 4 illustrates a schematic drawing of a brake assembly according to one embodiment of the present disclosure.
Figure 5:
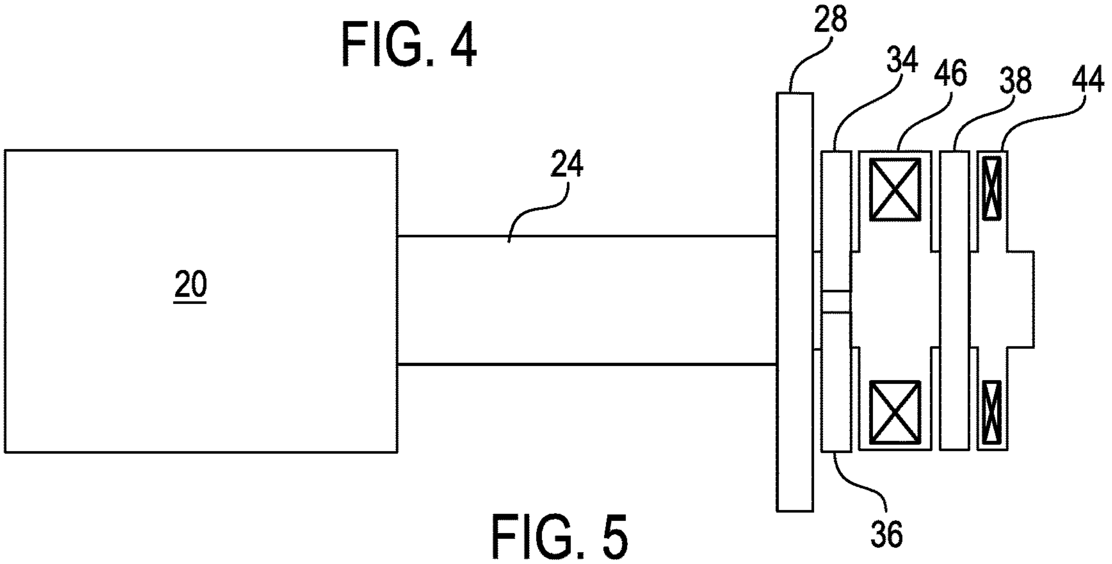
FIG. 5 illustrates a schematic drawing of a brake assembly according to one embodiment of the present disclosure.

FIGS. 3-5 illustrate different embodiments of the brake assembly 30. The brake assembly 30 comprises an asymmetrical brake 32 including at least three brake segments. Only three brake segments, 34, 36, and 38 are shown in the embodiments; however, it will be appreciated that more than three brake segments may be used in accordance with the present disclosure. In any embodiment, each of the at least three brake segments include a brake applying portion 40 disposed thereon. In any embodiment, the brake applying portion 40 may include a brake shoe to name one non-limiting example.

The brake assembly 30 further includes a brake activating device 42 operably coupled to the asymmetric brake 32. The brake activating device 42 includes a first activation element, such as a first coil 44 configured to activate one of the at least three brake segments (e.g. a brake segment 38), and a second activation element, such as a second coil 46 configured to activate the remaining of the at least three brake segments (e.g. brake segments 34 and 36).

The brake assembly 30, as shown in the embodiment of FIG. 3, may include an asymmetrical brake 32 including at least three brake segments 34, 36, and 38 located adjacent to one another and circumferentially disposed around a segmented plate. The brake assembly 30, as shown in the embodiment of FIG. 4, may include brake segments 34 and 36 circumferentially disposed around brake segment 38. It will be appreciated that brake segments 34, 36 need not be concentric to the brake segment 38. The brake assembly 30, as shown in the embodiment of FIG. 5, may be a stacked brake configuration, wherein the brake segments 34 and 36 are located adjacent to the disk 28. The second activation element 46 is located adjacent to brake segments 34 and 36. Brake segment 38 is located adjacent to the second activation element 46, and the first activation element 44 is located adjacent to the brake segment 38.

During operation, the brake activating device 42 may independently de-energize the first activation element 44 and/or second activation element 46 to increase flexibility of the timing and braking torque applied to the shaft 24 or disk 28. For example, in situations where the elevator car 12 is empty and moving in a downward direction, the brake activating device 42 may de-energize the first activation element 44 and the second activation element 46 to apply all of the at least three brake segments 34, 36, and 38.

In a situation where the elevator car 12 is empty and moving in an upward direction, the brake activating device 42 may sequentially activate the asymmetric brake 30 by first de-energizing the second activation element coil 46 to apply all but one of the brake segments (e.g. brake segments 34 and 36); then, after a time delay, de-energizing the first activation element 44 to apply one of the brake segments (e.g. brake segment 38).

In a situation where the elevator car 12 is balanced and moving in either the up or down direction, the brake activating device 42 may sequentially activate the asymmetric brake 30 by first de-energizing the first activation element 44 to apply the third brake segment 38; then, after a time delay, de-energizing second activation element 46 to apply the first brake segment 34 and second brake segment 36.

It will be appreciated that the brake assembly 30 includes an asymmetrical brake 32 including at least three brake segments operably coupled to a brake activating device configured to independently operate the at least three brake segments to selectively apply different brake torques to the shaft 24 or disk 28 to improve stopping performance.

While the present disclosure has been illustrated and described in detail in the drawings and foregoing description, the same is to be considered as illustrative and not restrictive in character, it being understood that only certain embodiments have been shown and described and that all changes and modifications that come within the spirit of the present disclosure are desired to be protected.

What is claimed is:

1. An elevator brake assembly comprising:

an asymmetrical brake comprising at least three brake segments; and a brake activating device operably coupled to the asymmetrical brake, the brake activating device comprising a first activation element and a second activation element;

wherein the first activation element is configured to activate one of the at least three brake segments, and the second activation element is configured to activate the remaining of the at least three brake segments;

wherein the brake activating device is configured to operate according to at least one:

wherein, when an elevator car is empty and moving in a downward direction, the brake activating device is configured to activate both the first activation element and the second activation element to apply the at least three brake segments;

the elevator car is empty and moving in an upward direction, the brake activating device is configured to sequentially activate the asymmetrical brake by activating the second activation element to apply all but one of the at least three brake segments and, after a time delay, activate the first activation element to apply one of the at least three brake segments;

the elevator car is balanced and moving in either the up or down direction, the brake activating device is configured to sequentially activate the asymmetric brake by activating the first activation element to apply one of the at least three brake segments and, after a time delay, activate the second activation element to apply the remaining at least three brake segments;

wherein the at least three brake segments comprise a first brake segment positioned adjacent to a second brake segment; the second activation element is positioned adjacent to the first brake segment and the second brake segment, a third brake segment positioned adjacent to the second activation element, and the first activation element is positioned adjacent to the third brake segment.

2. The elevator brake assembly of claim 1, the at least three brake segments further comprising a plurality of brake applying portions, wherein a respective one of the plurality of brake applying portions is disposed on each of the at least three brake segments.

3. The elevator brake assembly of claim 2, wherein the plurality of brake applying portions comprises a plurality of shoes.

4. The elevator brake assembly of claim 1, wherein the first activation element comprises a first coil and the second activation element comprises a second coil.

5. An elevator system comprising:

a machine housing;

a rotatable output shaft mounted in said machine housing;

a sheave mounted on said output shaft and rotatable therewith; and a brake assembly configured for braking said output shaft, the brake assembly comprising:

an asymmetrical brake comprising at least three brake segments; and a brake activating device operably coupled to the asymmetrical brake, the brake activating device comprising a first activation element and a second activation element;

wherein the first activation element is configured to activate one of the at least three brake segments, and the second activation element is configured to activate the remaining of the at least three brake segments;

wherein the brake activating device is configured to operate according to at least one:

an elevator car is empty and moving in a downward direction, the brake activating device is configured to activate the first activation element and the second activation element to apply the at least three brake segments;

the elevator car is empty and moving in an upward direction, the brake activating device is configured to sequentially activate the asymmetrical brake by activating the second activation element to apply all but one of the at least three brake segments and, after a time delay, activate the first activation element to apply one of the at least three brake segments;

the elevator car is balanced and moving in either the up or down direction, the brake activating device is configured to sequentially activate the asymmetric brake by activating the first activation element to apply one of the at least three brake segments and, after a time delay, activate the second activation element to apply the remaining at least three brake segments;

wherein the asymmetrical brake comprises a first brake segment positioned adjacent to a second brake segment; the second activation element is positioned adjacent to the first brake segment and the second brake segment, a third brake segment positioned adjacent to the second activation element, and the first activation element is positioned adjacent to the third brake segment.

6. The elevator system of claim 5, wherein the asymmetrical brake further comprises a plurality of brake applying portions, wherein a respective one of the plurality of brake applying portions is disposed on each of the at least three brake segments.

7. The elevator system of claim 6, wherein the plurality of brake applying portions comprises a plurality of shoes.

8. The elevator system of claim 5, wherein the first activation element comprises a first coil and the second activation element comprises a second coil.

* * * * *